US006570686B1

(12) United States Patent
Kim

(10) Patent No.: US 6,570,686 B1
(45) Date of Patent: May 27, 2003

(54) REFERENCE WAVELENGTH PROVIDING DEVICE FOR PERFORMANCE MONITOR IN WDM OPTICAL TRANSMISSION SYSTEM

(75) Inventor: Byeong-Hoon Kim, Kyonggi-do (KR)

(73) Assignee: Samsung Electronics Co. LTD, Suwon (KR)

( * ) Notice: Subject to any disclaimer, the term of this patent is extended or adjusted under 35 U.S.C. 154(b) by 0 days.

(21) Appl. No.: 09/569,568

(22) Filed: May 12, 2000

(30) Foreign Application Priority Data

May 12, 2000 (KR) .......................................... 99-17015

(51) Int. Cl.[7] ................................................ H04J 14/02
(52) U.S. Cl. ........................ 359/124; 359/110; 359/127; 359/133; 359/188; 359/193
(58) Field of Search .................. 359/110, 124, 359/127, 133, 188, 193

(56) References Cited

U.S. PATENT DOCUMENTS 5,699,178 A * 12/1997 Ostlund ...................... 359/161
5,949,562 A * 9/1999 Kubota et al. ............... 359/124
5,978,391 A * 11/1999 Das et al. ....................... 372/20
6,115,520 A * 9/2000 Laskowski et al. ............ 385/50
6,215,572 B1 * 4/2001 Taneda ........................ 359/177

* cited by examiner

Primary Examiner—Leslie Pascal
Assistant Examiner—Dzung Tran
(74) Attorney, Agent, or Firm—Cha & Reiter

(57) ABSTRACT

A device for providing a reference wavelength which is used in monitoring the performance of a WDM optical transmission system which includes a light emitting diode (LED) generating light in a predetermined wavelength band, a filter receiving the light from the LED and filtering an optical signal at a predetermined reference wavelength, a tap coupler extracting a portion of the optical transmission data, a coupler coupling the output of the tap coupler with the output of the filter, a sawtooth wave generator generating sawtooth waves in a voltage range which includes the reference wavelength and the different wavelengths of the optical transmission light, and a variable optical filter receiving the output of the coupler and the sawtooth waves and filtering the output of the coupler where the sawtooth waves overlap.

11 Claims, 6 Drawing Sheets

REFERENCE WAVELENGTH PROVIDING DEVICE FOR PERFORMANCE MONITOR IN WDM OPTICAL TRANSMISSION SYSTEM

CLAIM OF PRIORITY

This application makes reference to, incorporates the same herein, and claims all benefits accruing under 35 U.S.C. Section 119 from an application for "Reference Wavelength Providing Device for Performance Monitor in WDM Optical Transmission System" filed in the Korean Industrial Property Office on May 12, 1999 and there duly assigned Serial No. 99-17015.

BACKGROUND OF THE INVENTION

1. Field of the Invention

The present invention relates generally to a performance monitoring device in an optical transmission system using wavelength division multiplexing (WDM) technologies, and in particular, to a device for providing a reference wavelength that can be used in the performance monitoring device.

2. Description of the Related Art

FIG. 1 illustrates a schematic view of a basic WDM optical transmission system. As shown in FIG. 1, the WDM optical transmission system is provided with a transmitter 100, a transmission line unit 106, and a receiver 110. The transmitter 100 includes a plurality of channel transmitters from $102_1$ to $102_N$ and a wavelength multiplexer (MUX) 104. The channel transmitters $102_1$ to $102_N$ are coupled to the SDH (Synchronous Digital Hierarchy) equipment and the ATM (Asynchronous Transfer Mode) equipment that are supported by a particular WDM transmission equipment or exchange equipment for receiving optical data therefrom. Each of the transmitters modulates an optical signal received therein at an assigned wavelength through the optical/electrical/optical conversion and feeds the converted optical signal to the wavelength MUX 104. The wavelength MUX 104 multiplexes the modulated data at different wavelengths received from the transmitters $102_1$ to $102_N$ and transmits the multiplexed optical signal to the remote receiver 110 through a transmission line unit 106.

Generally, in the transmission of optical signals at 2.5 Gbps, an optical amplifier is required for the transmission distance higher than 80 km. Thus, a plurality of optical amplifiers $108_1$ to $108_N$ is installed in sequence along the transmission line unit 106. A series of EDFAs (Erbium-doped Fiber Amplifiers) are used as the optical amplifiers $108_1$ to $108_N$ to serve as power amplifiers, line amplifiers, and preamplifiers. The receiver 110, which includes a wavelength demultiplexer (DEMUX) 112 and a plurality of channel receivers $114_1$ to $114_N$, receives a composite light beam having component light beams of different wavelengths originated from the transmitter 100 through the transmission line unit 106. The wavelength DEMUX 112 separates the composite input optical signal into component light beams of different wavelengths respectively and feeds the separated light beam to the channel receivers $114_1$ to $114_N$. Then, the channel receivers $114_1$ to $114_N$ subject the received optical signal to the opto-electric conversion for further processing.

When optical signals are multiplexed, fluctuations in the wavelength of the transmitter and the wavelength characteristics of the optical wavelength multiplexer/demultiplexer result in the deterioration of receiver sensitivity. Thus, monitoring the wavelength throughout the system is an essential technique. As the spacing between the wavelengths of the WDM signal light are close to each other, it is important to maintain each signal at its wavelength to avoid crosstalk between channels. To monitor the spacing between the channels, various performance monitors are used in the transmitter, receiver, and optical amplifiers. WDM systems have rapidly developed moving to 8 and 16 (and higher) wavelength systems with the channel transmission rate of 2.5 Gbps and a transmission capacity of 20 or 40 Gbps. Thus, any possible malfunction of the component devices can deteriorate the multitude of communications services in the WDM optical transmission system. This is the reason why it is so important and necessary to monitor the various characteristics of the WDM signal light in future optical wave networks.

For example, it may be necessary to monitor (a) the total input/output optical power, (b) an optical power in each input/output channel, (c) an Optical Signal-to-Noise Ratio (OSNR) of each channel, and (d) a wavelength in each channel. The total input/output power is easily monitored through the implementation of an optical tap coupler and a photo-diode. However, to monitor the optical output, the OSNR, and the wavelength in each channel of WDM signal light, each multiplexed optical signal should be separated into component light beams of different wavelengths respectively. Hence, it is expensive to implement such a monitoring device.

The wavelength of optical signal, the OSNR, and the input light intensity of an optical amplifier are important characteristics to monitor for high accuracy. A slight variation in these values can affect the output of an optical amplifier and accelerate the gain tilt and cause a great output difference in the wavelengths.

Currently, different companies in various countries have deployed their own performance monitoring devices for monitoring the WDM optical transmission system—such as the LG and the KAIST in Korea; the Lucent, the NTT, the Queensgate, and the HP in other countries. These various performance monitoring technologies can be categorized into three types.

(1) The optical signal is demultiplexed using an optical demultiplexer for monitoring each output wavelength. In this area, the Lucent uses fiber gratings as the demultiplexer, the HP uses AWGs (Arrayed Waveguide Gratings) as the demultiplexer, and the LG uses a coupler and a fixed filter as the demultiplexer.

This first type of technologies has shortcomings in that the fiber grating, by the Lucent, still needs to improve its long-term stability and reliability. The AWGs, by the HP, are too expensive, and the use of a coupler and a fixed filter, used the LG, increases the size and cost of the monitoring device. In a further attempt to accurately detect an accurate wavelength, the HP implemented a device for providing a reference wavelength using an He—Ne laser on the market. However, the He—Ne laser, which is a gas laser, is not suitable for the transmission equipment since it has to be replaced whenever the pressure of the filled gas drops below a certain level.

(2) A pilot tone is used by the Lucent and the KAIST to monitor various characteristics of the WDM signal light. An optical transmitter operating at 2.5 Gbps or higher transmits an additional modulation signal in a voice frequency band. Then, the optical output, the OSNR, and the wavelengths at each wavelength are measured using the modulated pilot tone. The problem with the second technology is that the introduction of pilot tone signals along the transmission path can create noises at the receiving end, thus hindering the measurement of each wavelength with high accuracy.

(3) A variable optical filter is used to monitor the WDM signal light, which was disclosed by the NTT at the Optical Fiber Communication Conference (OFC) in 1998. The variable optical filter is implemented in conjunction with the sawtooth waveforms, so as to detect the variations in the optical outputs with respect to wavelengths changed with the passage of time passage are measured. Then, the optical output and the OSNR at each wavelength are measured.

FIG. 2 depicts the performance monitor 204 configured according to the third technology. As illustrated in FIG. 2, an input optical signal is applied to a tap coupler 200. The tap coupler 200 extracts a portion of the optical signal so that the extraction has no influence on the transmission signal. A variable optical filter 206 filters the output of the tap coupler 200 at wavelengths limited by the sawtooth waves received from a sawtooth wave generator 208. Accordingly, transmission occurs only where the transmission conditions for both filters line up. Thus, for the input of the sawtooth wave, as shown in (a) of FIG. 3, the filtering wavelength is varied according to the voltage of the sawtooth wave, then the optical transmission signals are outputted at each wavelength $\lambda_{-1}, \lambda_{-2}, \lambda_{-3}, \lambda_{-4}, \ldots \lambda_{-n}$, as shown in (b) of FIG. 3. A photo-diode 210 converts the optical transmission data received from the variable optical filter to an electrical signal. A processor 212 measures the optical power and the OSNR of each channel from the electrical signal received from the photo-diode 210.

However, this third method is still inferior in measuring the wavelengths with high accuracy. To solve this problem, the KAIST has suggested a method of generating a reference wavelength using an optical grating filter and then measuring the accurate optical output, the OSNR, and the wavelength of each channel through the implementation of a variable optical filter. Normally, the optical signals are extracted from the output/input of an EDFA but recently they are also extracted from a port. This method also has problem in that a device to be monitored, like the EDFA, has to generate light at the reference wavelength causing noises and the light signal has to be extracted from two locations.

Moreover, wavelengths can not be determined accurately because the wavelength of AWG or fiber gratings used in the prior art are influences by ambient temperature. Thus, even if the performance monitor in the prior art provides the output power and the OSNR at each wavelength, there is no guarantee that they are accurate.

Furthermore, a gas laser and an optical fiber grating filter have been used to provide a reference wavelength but they are expensive, and at least two tap points are needed.

SUMMARY OF THE INVENTION

It is, therefore, an object of the present invention to provide a reference wavelength providing a device for a performance monitor in a WDM optical transmission system, which can provide a reference wavelength economically by incorporating a simple design.

The above object of the present invention can be achieved by providing a reference wavelength providing device for a performance monitor in a WDM optical transmission system. The device includes: a light emitting diode (LED) generating light in a predetermined wavelength band; a filter receiving light from the LED and filtering only an optical signal at a predetermined reference wavelength; a tap coupler extracting a part of the optical transmission data; a coupler coupling the output of the tap coupler with the output of the filter; a sawtooth wave generator generating sawtooth waves in a voltage range corresponding to the range that includes the reference wavelength and the wavelengths of a plurality of channels of the optical transmission signal; and, a variable optical filter receiving the output of the coupler and the sawtooth waves and filtering the output of the coupler while varying the filtering wavelength according to the voltages of the sawtooth waves.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The preferred embodiments of the present invention will be described hereinbelow with reference to the accompanying drawings. For the purpose of clarity, well-known functions or constructions are not described in detail as they would obscure the invention in unnecessary detail.

Figure 1:
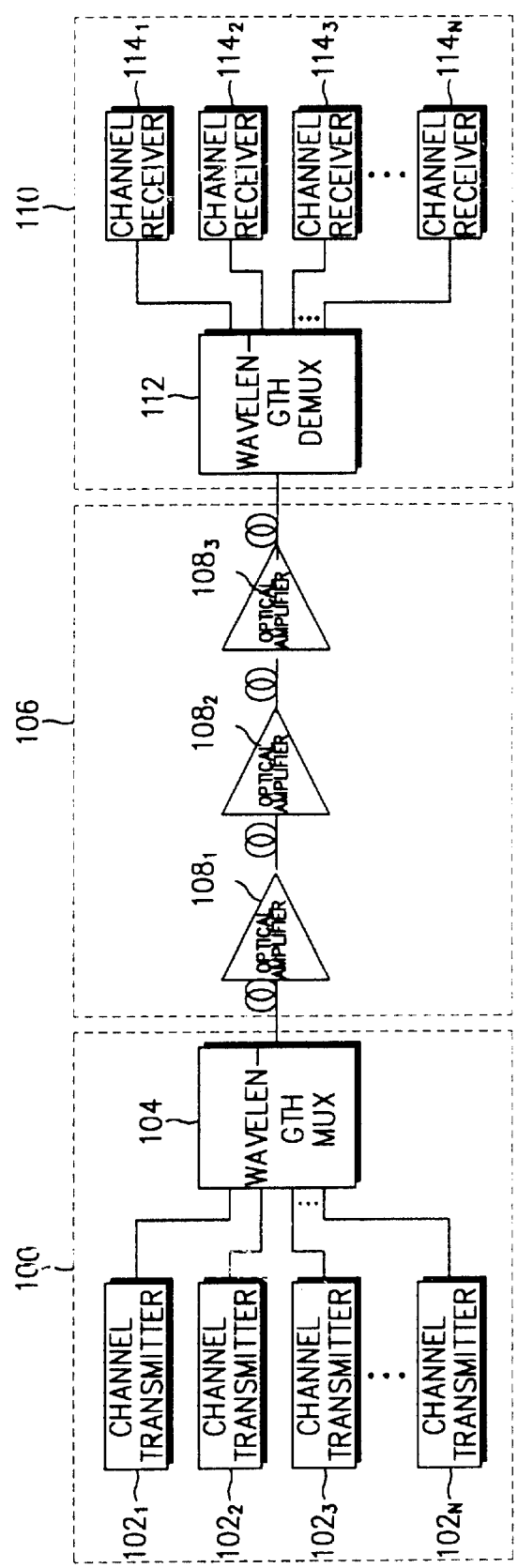
FIG. 1 is a schematic view of a WDM transmission system.
Figure 2:
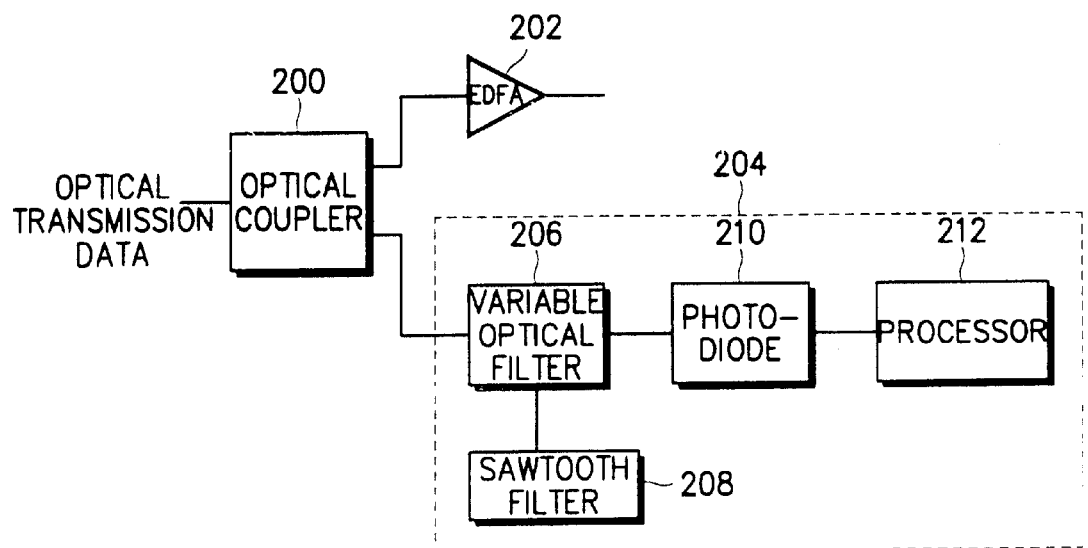
FIG. 2 is a schematic view of a conventional performance monitor in the WDM transmission system.
Figure 3:
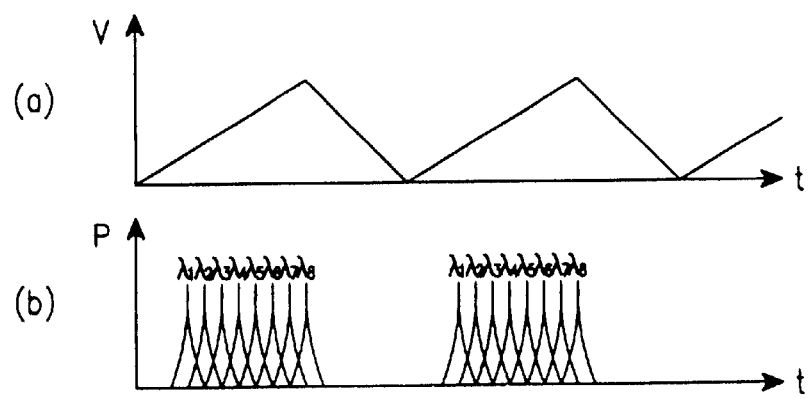
FIG. 3 illustrates the waveforms of the signals in the conventional performance monitor of FIG. 2.
Figure 4:
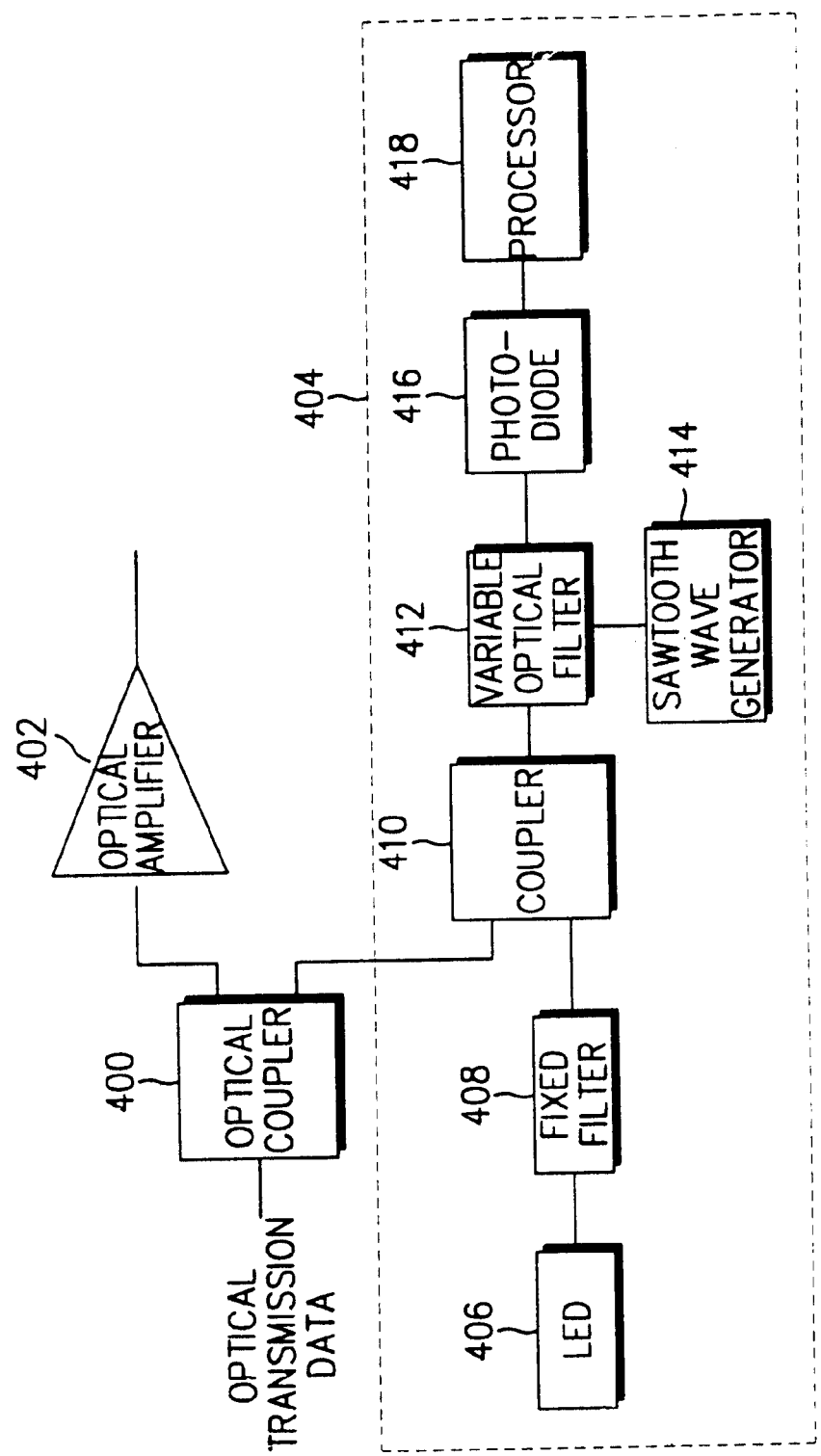
FIG. 4 is a schematic view of the performance monitor in a WDM optical transmission system according to the preferred embodiment of the present invention.

FIG. 4 is a schematic view of the performance monitor in a WDM optical transmission system according to the preferred embodiment of the present invention. As shown in FIG. 4, an optical tap coupler 400 receives optical transmission signals and splits the received optical signals in the ratio of 99:1 or 97:3, then feeds the divided optical signal to an optical amplifier 402 and a performance monitor 404, respectively. A Light Emitting Diode (LED) 406 of the performance monitor 404 generates light at 1490 nm, which is sufficiently distant from the light source to be effected, into a fixed filter 408. The fixed filter 408 only filters the generated light received from the LED 406 at a predetermined reference wavelength. Here, the reference wavelength is shorter than the wavelengths of channels of the transmission data. A coupler 410 couples the optical transmission signal received from the optical tap coupler 400 with the light signal received from the fixed filter 408 at a predetermined reference wavelength.

Figure 5:
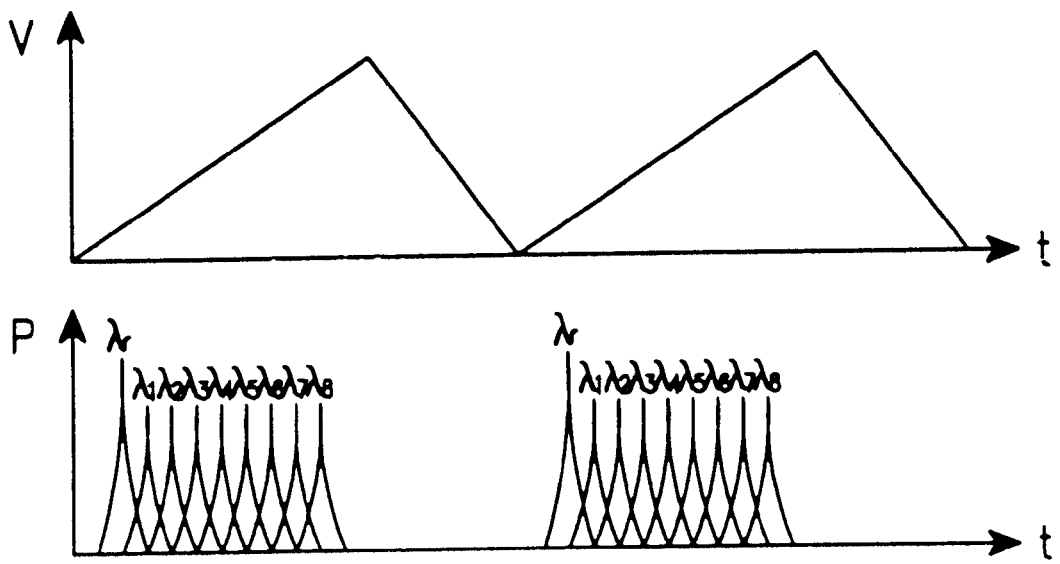
FIG. 5 illustrates signal output waveforms of the performance monitor shown in FIG. 4.

A variable optical filter 412 filters the output signal of the coupler 410 only within the range that falls within the increased voltage range of a sawtooth wave generated from a sawtooth wave generator 414, as shown in FIG. 5. The sawtooth wave generator 414 generates the sawtooth waves in the voltage range that includes the reference wavelength and the wavelengths of channels of the optical transmission signals. Thus, the variable optical filter 412 in turn sequentially outputs the optical signals at the reference wavelength $\lambda$ and the wavelengths $\lambda_1, \lambda_2, \lambda_3, \lambda_4, \ldots \lambda_n$ corresponding to each different wavelength respectively, as shown in FIG. 5. A photo-diode 416 converts the output of the variable optical filter 412 into an electrical signal. A processor 418 receives the converted electrical signal from the photo-diode 416, locates the wavelength of each channel by counting time from the signal from the reference wavelength, then determines the state of the signal at the wavelength for performance monitoring purposes.

Figure 6:
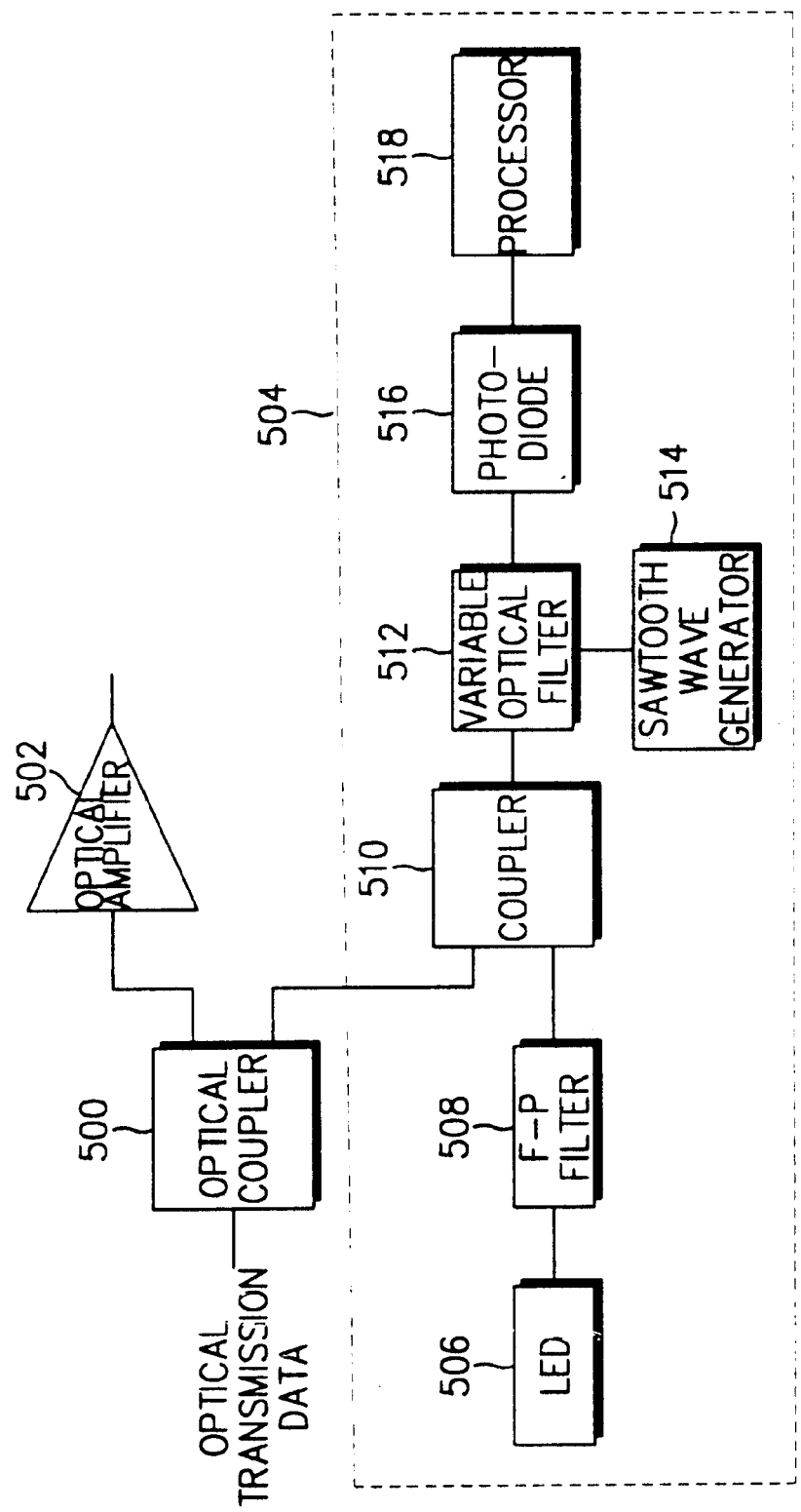
FIG. 6 is a schematic view of the performance monitor in the WDM optical transmission system according to another preferred embodiment of the present invention; and, FIG. 7 illustrates output signal waveforms of the performance monitor shown in FIG. 6.

FIG. 6 is a schematic view of the performance monitor in a WDM optical transmission system according to another preferred embodiment of the present invention. With reference to FIG. 6, an optical tap coupler 500 receives optical transmission data and splits the received optical signal in the ratio of 99:1 or 97:3 to be transmitted to an optical amplifier 502 and a performance monitor 504, respectively. An LED 506 in the performance monitor 504 generates light at 1550 nm into an F-P filter 508. The F-P 508 filters the received light from the light received from the LED 506 at two different predetermined reference wavelengths. Here, one of the reference wavelength is shorter than the wavelengths of the transmission signal channels and the other is longer than the wavelengths of the transmission signal channels. A coupler 510 couples the portion of the optical transmission signal received from the optical tap coupler 500 with the signal light from the F-P filter 508.

Figure 7:
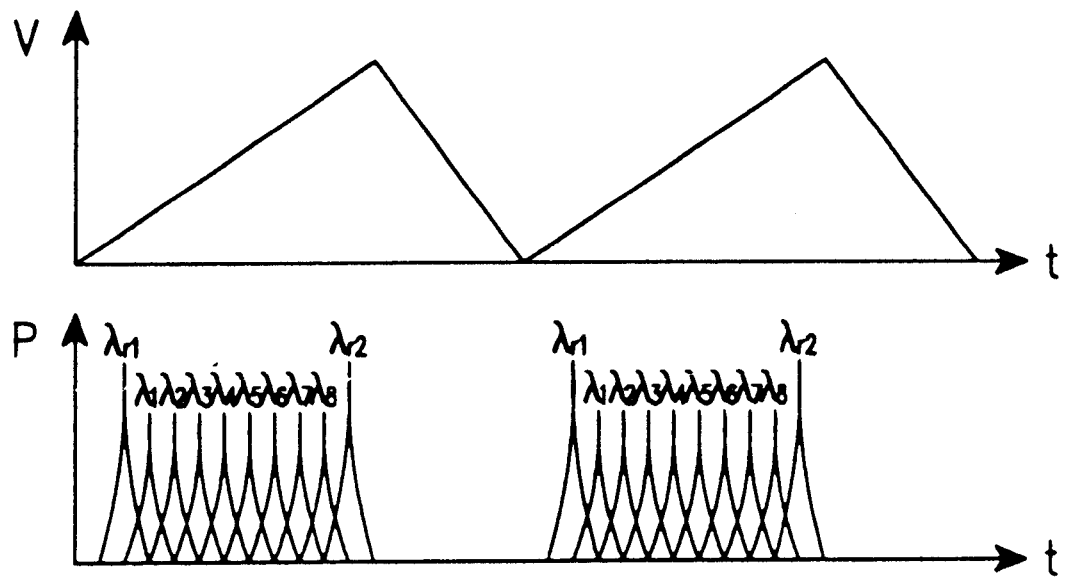

A variable optical filter 512 filters the output signal of the coupler 510 with a wavelength range corresponding to the increase voltage region of the sawtooth wave that is received from a sawtooth wave generator 514, as illustrated in FIG. 7. The sawtooth wave generator 514 generates the sawtooth waves in a voltage range corresponding to the range, which includes the two reference wavelengths and the wavelengths of the optical transmission signal channels. Thus, the variable optical filter 512 sequentially outputs an optical signal at the first reference wavelength $\lambda_{r1}$ the optical signals at the wavelengths $\lambda_1, \lambda_2, \lambda_3, \lambda_4, \ldots \lambda_n$ of channels, and the optical signal at the second reference wavelength $\lambda_{r2}$ within the sawtooth voltage range that falls under the positive voltage slope, as shown in FIG. 7. A photo-diode 516 converts the output signal of the variable optical filter 512 into an electrical signal. A processor 518 receives the converted electrical signal from the photo-diode 516, locates the wavelength of each channel by counting time from the signals at the reference wavelengths, and determines the state of the signal at the wavelength, for monitoring purposes. Here, the peaks of the multiplexed optical signals are disposed between the two peaks of the two reference wavelengths.

In accordance with the present invention as described above, an optical signal at a reference wavelength is generated using only an LED and a fixed filter, or an LED and an F-P filter. Therefore, the optical signal at the reference wavelength can be provided to a performance monitor economically using a simple design.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A device for providing a reference wavelength that can be used in monitoring the performance of a WDM optical transmission system, comprising:

a first coupling means for extracting a portion of incoming optical light having different wavelengths;

a light inputting means for generating an input light beam;

a filtering means for filtering said input light beam at a predetermined reference wavelength;

a second coupling means for coupling said filtered input light beam with the portion of said incoming optical light;

a wave generating means for generating sawtooth waves in a voltage range that includes said predetermined reference wavelength and the wavelengths of said incoming optical light; and, a variable filtering means for filtering at least part of the output light from said second coupling means and said generated sawtooth waves.

2. The device as recited in claim 1, said device further comprising:

a photodetecting means for detecting the optical signal outputted from said variable filtering means and for converting said detected optical signal into an electrical signal;

a controlling means for measuring an optical power level and an optical signal-to-noise ratio (OSNR) of said converted electrical signal from said photodetecting means.

3. The device as recited in claim 1, wherein said variable filtering means outputs the optical light where the wavelength for both said second coupling means output light and said generated sawtooth waves line up.

4. The device as recited in claim 1, wherein said predetermined reference wavelength is shorter than the wavelength of said incoming optical light.

5. The device as recited in claim 1, wherein said light input means is a light emitting diode (LED).

6. The device as recited in claim 1, wherein said light input means generates said input light beam at the wavelength of 1990 nm.

7. A device for providing a reference wavelength which is used in monitoring the performance of a WDM optical transmission system, comprising:

a first coupling means for extracting a portion of incoming optical light having different wavelengths;

a light inputting means for generating an input light beam;

a filtering means for filtering said input light beam at two different predetermined reference wavelengths;

a second coupling means for coupling said two filtered input light beams with the portion of said incoming optical light;

a wave generating means for generating sawtooth waves in a voltage range that includes said two predetermined reference wavelengths and the wavelengths of said incoming optical light; and, a variable filtering means for filtering at least part of the output light from said second coupling means and said generated sawtooth waves.

8. The device as recited in claim 7, said device further comprising:

a photo-detecting means for detecting the optical signal outputted from said variable filtering means and for converting said detected optical signal into an electrical signal;

a controlling means for measuring an optical power level and an optical signal-to-noise ratio (OSNR) of said converted electrical signal from said photodetecting means.

9. The device as recited in claim 7, wherein said variable filtering outputs the optical light where the wavelength for both said second coupling means output light and said generated sawtooth waves line up.

10. The device as recited in claim 7, wherein one of said two reference wavelengths is shorter than the wavelength of said incoming optical light and said other is longer than the wavelength of said incoming optical light.

11. The device as recited in claim 7, wherein said light input means generates said input light beam at the wavelength of 1550 nm.

* * * * *